(12) United States Patent
Schroecker

(10) Patent No.: US 9,818,220 B2
(45) Date of Patent: Nov. 14, 2017

(54) METHOD AND SYSTEM FOR INDICATING LIGHT DIRECTION FOR A VOLUME-RENDERED IMAGE

(75) Inventor: Gerald Schroecker, Salzburg (AT)

(73) Assignee: General Electric Company, Schenectady, NY (US)

(*) Notice: Subject to any disclaimer, the term of this patent is extended or adjusted under 35 U.S.C. 154(b) by 1012 days.

(21) Appl. No.: 13/338,888

(22) Filed: Dec. 28, 2011

(65) Prior Publication Data

US 2013/0169641 A1 Jul. 4, 2013

(51) Int. Cl.
*G06T 15/50* (2011.01)
*G06T 15/08* (2011.01)
*G06T 15/80* (2011.01)

(52) U.S. Cl.
CPC .............. *G06T 15/08* (2013.01); *G06T 15/80* (2013.01); *G06T 2210/41* (2013.01)

(58) Field of Classification Search
CPC ...... G06T 15/08; G06T 15/80; G06T 2210/41
See application file for complete search history.

(56) References Cited

U.S. PATENT DOCUMENTS

| 7,301,538 B2 | 11/2007 | Buyanovskiy | |
|---|---|---|---|
| 8,830,263 B2 | 9/2014 | Kohara et al. | |
| 2002/0085681 A1* | 7/2002 | Jensen | 378/197 |
| 2003/0037111 A1* | 2/2003 | Yoshioka | 709/205 |
| 2004/0075658 A1* | 4/2004 | Goto | 345/426 |
| 2004/0167646 A1* | 8/2004 | Jelonek et al. | 700/97 |
| 2005/0024724 A1 | 2/2005 | Kim et al. | |
| 2006/0066616 A1* | 3/2006 | Sevastianov et al. | 345/426 |
| 2006/0155800 A1* | 7/2006 | Matsumoto | 709/200 |
| 2009/0181769 A1* | 7/2009 | Thomas et al. | 463/32 |
| 2010/0060638 A1* | 3/2010 | Breton et al. | 345/426 |
| 2012/0030630 A1* | 2/2012 | Grossman et al. | 715/850 |
| 2012/0169712 A1* | 7/2012 | Hill et al. | 345/419 |
| 2012/0284671 A1* | 11/2012 | Bamford et al. | 715/850 |
| 2014/0071132 A1 | 3/2014 | Noshi et al. | |

FOREIGN PATENT DOCUMENTS

| CN | 1776747 A | 5/2006 |
|---|---|---|
| CN | 101324962 A | 12/2008 |
| JP | 05-210727 | 8/1993 |
| JP | 07-037121 A | 2/1995 |

(Continued)

OTHER PUBLICATIONS

"Video" based on the youtube video at URL http://www.youtube.com/watch?v=7OHxInSwFDw published on Nov. 29, 2008.*

(Continued)

*Primary Examiner* — Frank Chen
(74) *Attorney, Agent, or Firm* — McCoy Russell LLP

(57) ABSTRACT

A method and system for volume-rendering. The method and system include generating a volume-rendered image that is shaded from a light direction, displaying the volume-rendered image, displaying a model of a solid at the same time as the volume-rendered image, and displaying a light direction indicator with respect to the model of the solid, wherein the position of the light direction indicator corresponds to the light direction used for shading the volume-rendered image.

33 Claims, 5 Drawing Sheets

(56) References Cited

FOREIGN PATENT DOCUMENTS

| JP | 5562339 B | 7/2014 |
|----|-----------|--------|
| WO | 2011010644 A1 | 1/2011 |
| WO | 2012157493 A1 | 11/2012 |
| WO | 2012242906 A | 12/2012 |

OTHER PUBLICATIONS

Adaptive Atmospheric Modeling by Jorn Behrens et al.; ISBN-13 978-3-540-33382-8; copyrighted 2006.*
Blender from URL: https://www.youtube.com/watch?v=p18hHatvUQg (uploaded on Mar. 31, 2009).*
JP Office action for corresponding JP application No. 2012-277547 dated Sep. 27, 2016, with an English translation; 3 pages.
Zhang, Y. et al., "Accelerated Volume Rendering Using Texture Mapping with Phong Shading," Journal of Image and Graphics, vol. 8a, No. 9, Sep. 2003, 7 pages.
Sun, W., "Research on Key Technique of Ray Casting Volume Rendering Algorithm," Master's Thesis, Tianjin University of Technology, Jan. 2006, 55 pages.
Zhou, Z. et al., "A Novel Ray Casting Algorithm for the Display of Occluded Features," Chinese Journal of Computers, vol. 34, No. 3, Mar. 2011, 9 pages.
State Intellectual Property Office of the People's Republic of China, Office Action and Search Report Issued in Application No. 201210581627.1, Jun. 20, 2016, 20 pages. (Submitted with Machine Translation).

* cited by examiner

METHOD AND SYSTEM FOR INDICATING LIGHT DIRECTION FOR A VOLUME-RENDERED IMAGE

FIELD OF THE INVENTION

This disclosure relates generally to a method and system for displaying a light direction indicator to show the light direction used for shading a volume-rendered image.

BACKGROUND OF THE INVENTION

Volume-rendered images are very useful for representing 3D datasets, particularly in the field of medical imaging. Volume-rendered images are typically 2D representations of a 3D dataset. There are currently many different techniques for generating a volume-rendered image. One such technique, ray-casting, includes projecting a number of rays through the 3D dataset. Data along each of the rays is sampled, and then mapped to a color and transparency. Next, the data is accumulated along each of the rays. According to one common technique, the accumulated data along each of the rays is displayed as a pixel in the volume-rendered image. In order to gain an additional sense of depth and perspective, volume-rendered images are oftentimes shaded based on a light direction. The shading helps a viewer to more-easily comprehend and visualize the true three-dimensional shape of the object represented in the volume-rendered image. According to conventional shading algorithms, shading may be used with volume-rendered images in order to convey the relative positioning of structures or surfaces in the volume-rendered image.

Some conventional systems allow the user to alter the light direction in order to more clearly illustrate one or more targeted features in the volume-rendered image. However, since the light direction may be selected from any angular positions in three dimensions and since the display is only two-dimensional, it is often difficult for a user to quickly understand the current light direction used for determining the shading of the volume-rendered image. Additionally, it may be difficult for a user to visualize exactly how a specific control input will adjust the light direction with respect to the volume-rendered image.

Therefore, for these and other reasons, an improved system and method for indicating light direction for volume-rendered images is desired.

BRIEF DESCRIPTION OF THE INVENTION

The above-mentioned shortcomings, disadvantages and problems are addressed herein which will be understood by reading and understanding the following specification.

In an embodiment, a method of volume-rendering includes generating a volume-rendered image from a 3D dataset, wherein the volume-rendered image is shaded from a light direction. The method includes displaying a model of a solid at the same time as the volume-rendered image. The method includes displaying a light direction indicator with respect to the model of the solid, wherein the position of the light direction indicator with respect to the model of the solid corresponds to the light direction used for shading the volume-rendered image.

In another embodiment, a method of volume-rendering includes displaying a volume-rendered image that is shaded from a first light direction, displaying a model of a solid at the same time as the volume-rendered image. The method includes displaying a light source indicator at a first position with respect to the model of the solid. The first position of the light source indicator corresponds to the first light direction used to shade the volume-rendered image. The method includes moving with a user interface the light source indicator to a second position with respect to the model of the solid. The method includes automatically updating the shading on the volume-rendered image to correspond with the second position of the light source indicator with respect to the model of the solid.

In another embodiment, a system for interacting with a 3D dataset includes a display device, a memory, a user input, and a processor configured to communicate with the display device, the memory, and the user input. The processor is communicatively connected to the display device, the memory, and the user input, wherein the processor is configured to access a 3D dataset from the memory, generate a volume-rendered image from the 3D dataset that is shaded from a light direction, and display the volume-rendered image on the display device. The processor is configured to display a model of a solid at the same time as the volume-rendered image. The processor is configured to display a light source indicator at a position with respect to the model of the solid to indicate the light direction used for shading the volume-rendered image.

Various other features, objects, and advantages of the invention will be made apparent to those skilled in the art from the accompanying drawings and detailed description thereof.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken as limiting the scope of the invention.

Figure 1:
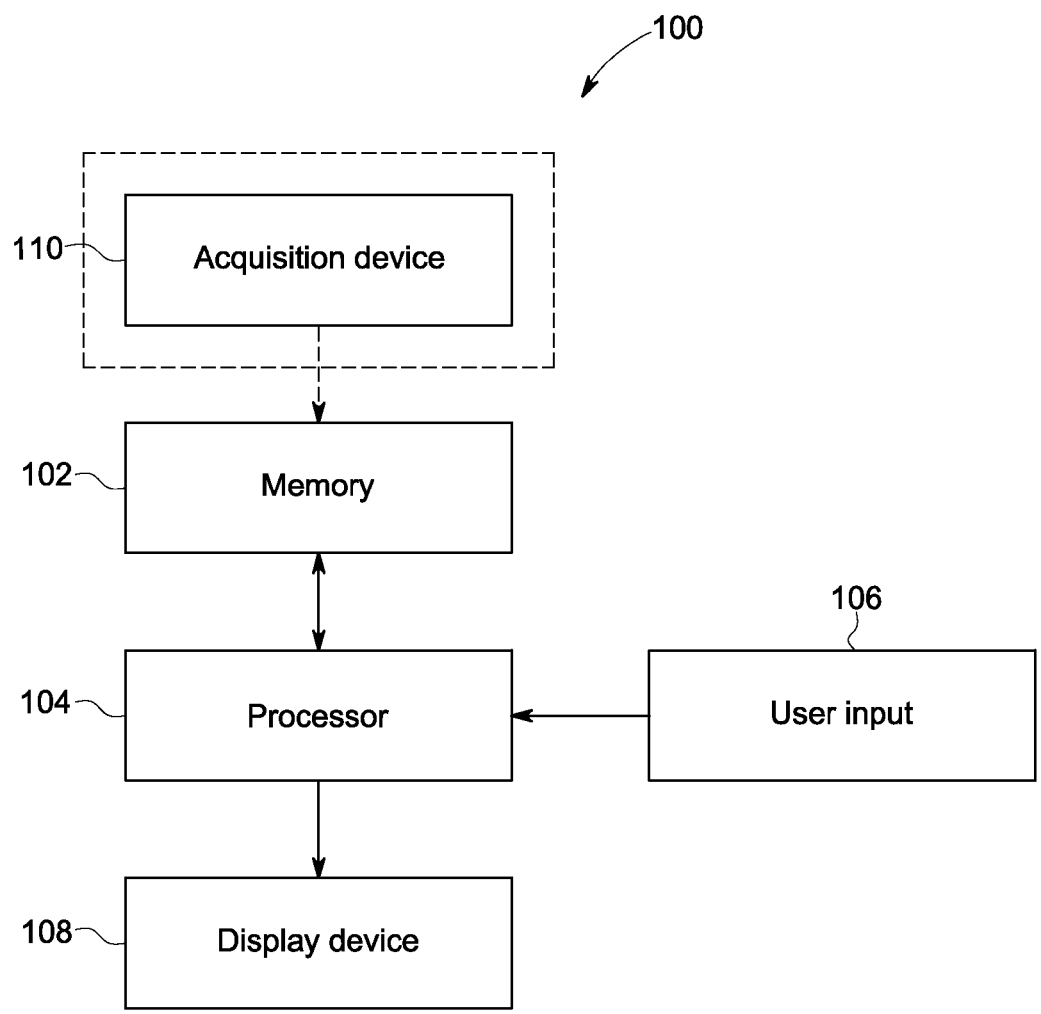
FIG. 1 is a schematic diagram of a system for interacting with 3D data in accordance with an embodiment.

FIG. 1 is a schematic diagram of a system for interacting with volumetric or 3D data according to an embodiment. The system 100 includes a memory 102, a processor 104, a user input 106, and a display device 108. The memory 102 may include any known medium for storing digital data, including, but not limited to a hard drive, a flash memory, random access memory (RAM), read only memory (ROM), a compact disc (CD), and a compact disc read-only memory (CD-ROM). The processor 104 is communicatively connected to the memory. The processor 104 may include one or more separate processing components. For example, the processor 104 may include a central processing unit (CPU), a microprocessor, a graphics processing unit (GPU), or any other electronic component capable of processing inputted data according to specific logical instructions. Having a processor that includes a GPU may advantageous for computation-intensive operations, such as volume-rendering large 3D datasets. According to some embodiments, the memory 102 may be co-located with the processor 104. However, according to other embodiments, the memory 102 may be remotely located with respect to the processor 104 and accessed through technologies including wireless networks, the internet, or an intranet.

A user input 106 is in communicatively connected to the processor 104. The user input 106 may include a trackball and one or more buttons according to an exemplary embodiment. However, according to other embodiments, the user input 106 may include one or more of a mouse, a track pad, a touch screen, rotary controls, or an assortment of hard or soft keys with defined functions. The display device 108 is communicatively connected to the processor 104 as well. The display device 108 may include a monitor or display such as a monitor, an LCD screen, an LED screen, a projector, or any other device suitable for displaying a volume-rendered image. Other embodiments may include multiple display devices, such as two or more LED screens.

The system 100 may optionally include an acquisition device 110 configured to acquire one or more 3D datasets. The acquisition device 110 may include any device configured to acquire 3D data. For example, the acquisition device 110 may include a medical imaging device such as a computed tomography (CT) system, a magnetic resonance tomography (MR) system, an ultrasound system, a nuclear medicine system, a positron emission tomography (PET) system, or any other imaging modality capable of acquiring 3D data such as optical imaging. According to other embodiments, the acquisition system may include a non-medical device capable of acquiring 3D data. According to other embodiments, the system 100 may receive one or more 3D datasets that were acquired or generated with a device that is separate from the system 100.

Figure 2:
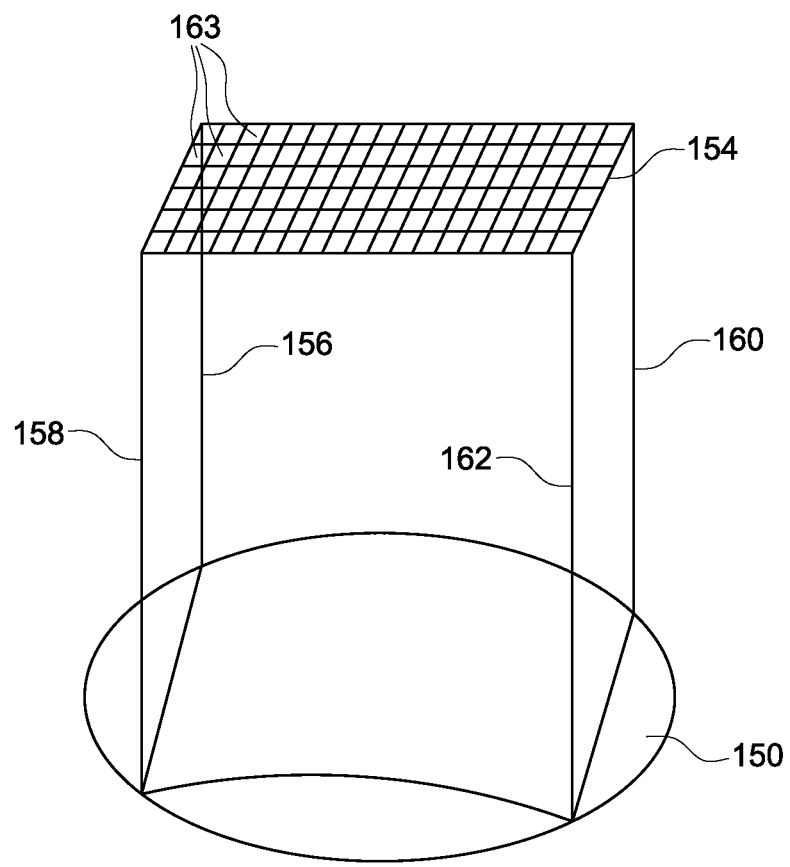
FIG. 2 is a schematic representation of the geometry that may be used to generate a volume-rendered image according to an embodiment.

FIG. 2 is a schematic representation of the geometry that may be used to generate a volume-rendered image according to an embodiment. FIG. 2 includes a 3D dataset 150 and a view plane 154.

Referring to both FIGS. 1 and 2, the processor 104 may generate a volume-rendered image according to a number of different techniques. According to an exemplary embodiment, the processor 104 may generate a volume-rendered image through a ray-casting technique from the view plane 154. The processor 104 may cast a plurality of parallel rays from the view plane 154 to the 3D dataset 150. FIG. 2 shows ray 156, ray 158, ray 160, and ray 162 bounding the view plane 154. It should be appreciated that additional rays may be cast in order to assign values to all of the pixels 163 within the view plane 154. The 3D dataset 150 comprises voxel data, where each voxel, or volume-element, is assigned a value or intensity. According to some embodiments, each voxel may be assigned an opacity as well. According to an embodiment, the processor 104 may use a standard "front-to-back" technique for volume composition in order to assign a value to each pixel in the view plane 154 that is intersected by the ray. For example, starting at the front, that is the direction from which the image is viewed, the intensities of all the voxels along the corresponding ray may be summed. Then, optionally, the intensity may be multiplied by an opacity corresponding to the voxels along the ray to generate an opacity-weighted value. These opacity-weighted values are then accumulated in a front-to-back direction along each of the rays 163. This process is repeated for each of the pixels 163 in the view plane 154 in order to generate a volume-rendered image. According to an embodiment, the pixel values from the view plane 154 may be displayed as the volume-rendered image. The volume-rendering algorithm may be configured to use an opacity function providing a gradual transition from opacities of zero (completely transparent) to 1.0 (completely opaque). The volume-rendering algorithm may factor the opacities of the voxels along each of the rays when assigning a value to each of the pixels 163 in the view plane 154. For example, voxels with opacities close to 1.0 will block most of the contributions from voxels further along the ray, while voxels with opacities closer to zero will allow most of the contributions from voxels further along the ray. Additionally, when visualizing a surface, a thresholding operation may be performed where the opacities of voxels are reassigned based on the values. According to an exemplary thresholding operation, the opacities of voxels with values above the threshold may be set to 1.0 while voxels with the opacities of voxels with values below the threshold may be set to zero. Other types of thresholding schemes may also be used. For example, an opacity function may be used where voxels that are clearly above the threshold are set to 1.0 (which is opaque) and voxels that are clearly below the threshold are set to zero (translucent). However, an opacity function may be used to assign opacities other than zero and 1.0 to the voxels with values that are close to the threshold. This "transition zone" may be used to reduce artifacts that may occur when using a simple binary thresholding algorithm. For example, a linear function mapping opacities to values may be used to assign opacities to voxels with values in the "transition zone". Other types of functions that progress from zero to 1.0 may also be used. According to other embodiments, volume-rendering techniques other than the ones described above may also be used in order to generate volume-rendered images from a 3D dataset.

The volume-rendered image may be shaded in order to present the user with a better perception of depth. For example, a plurality of surfaces may be defined based on the 3D dataset. Next, according to an exemplary embodiment, a gradient may be calculated at each of the pixels. The processor 104 (shown in FIG. 1) may then compute light reflection at positions on the surface corresponding to each of the pixels and apply standard shading methods based on the gradients and a specific light direction.

Figure 3:
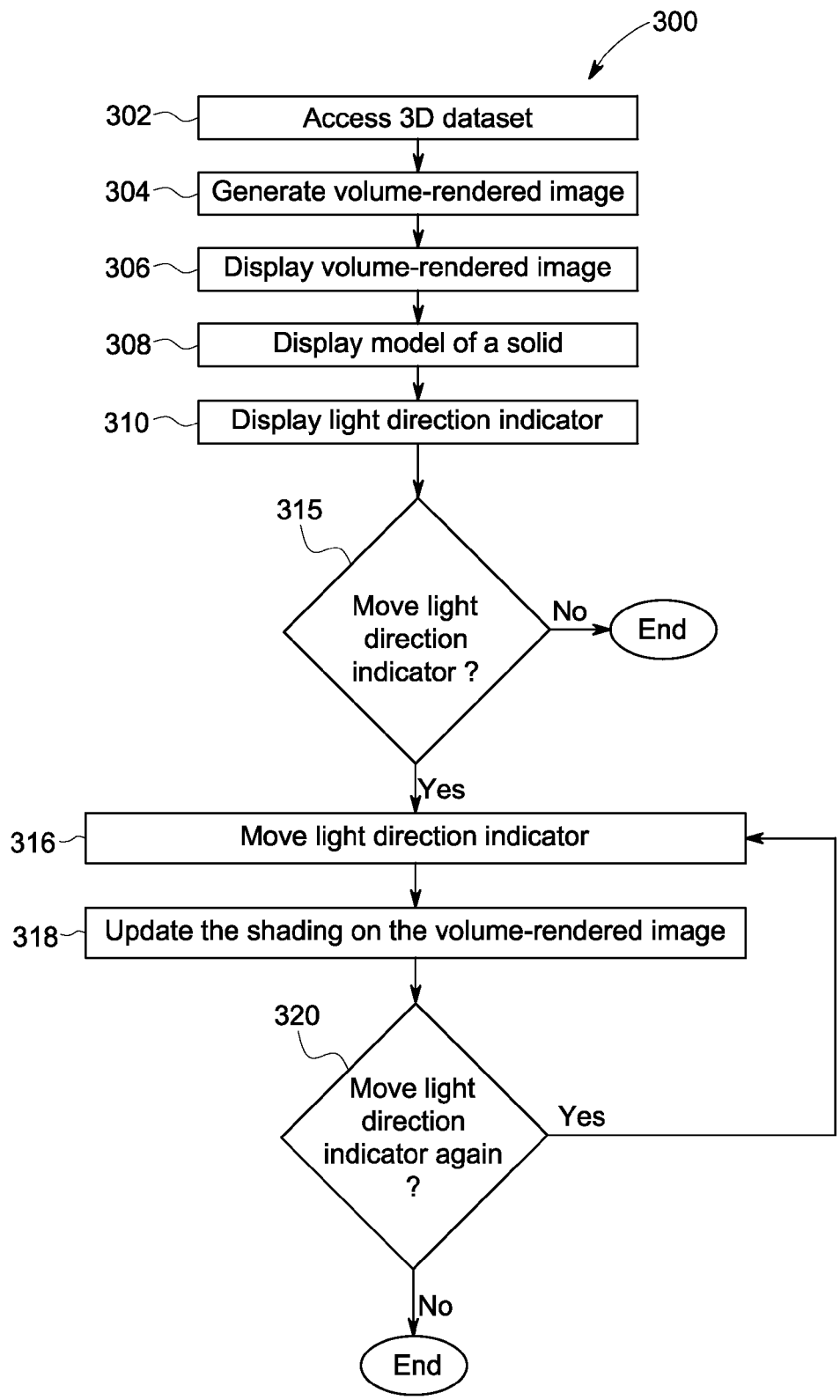
FIG. 3 is a flow chart illustrating a method 300 in accordance with an embodiment.

FIG. 3 is a flow chart illustrating a method 300 in accordance with an embodiment. The individual blocks represent steps that may be performed in accordance with the method 300. The technical effect of the method 300 is the display of a light direction indicator and a model of a solid in order to show a light direction used to determine the shading of a volume-rendered image.

Figure 4:
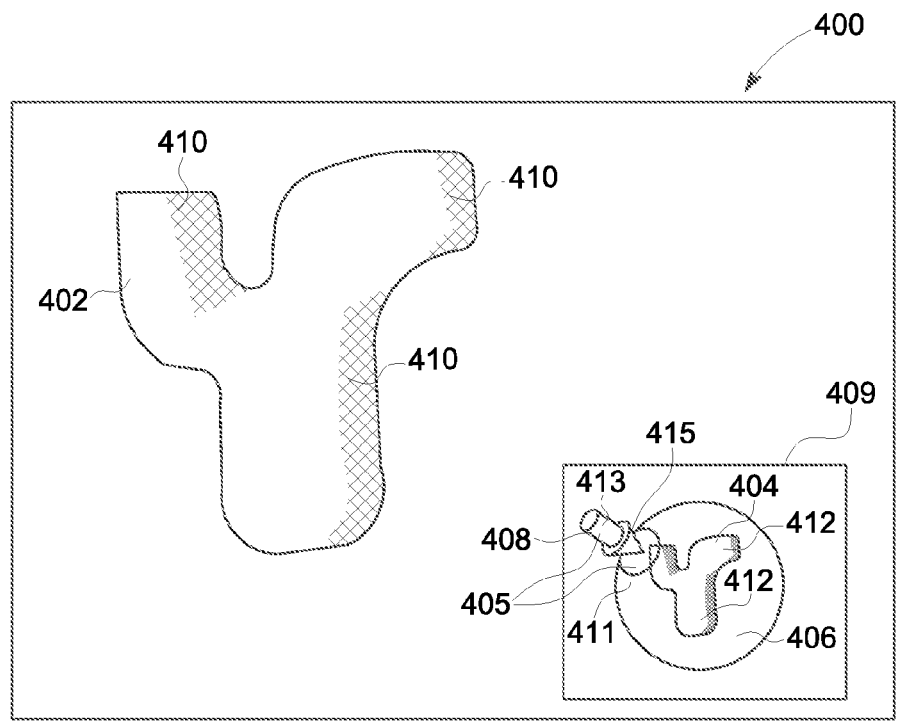
FIG. 4 is a schematic representation of a screen shot of a display device according to an embodiment.

FIG. 4 is a schematic representation of a screen shot of a display device according to an embodiment. The screen shot 400 includes a volume-rendered image 402, and a light navigator 409. The light navigator 409 includes a scale volume-rendered image 404, and a light direction indicator

405, and a model of a solid 406. For purposes of this disclosure, the term "light navigator" is defined to include the combination of a light direction indicator and a model of the solid. The light navigator 409, may also include the scale volume rendered image 404 according to some embodiments as shown in the embodiment of FIG. 4. Additional details about the screen shot 400 will be described hereinafter.

Referring to FIGS. 1, 3, and 4, at step 302 of the method, the processor 104 accesses a 3D dataset. As described previously, the 3D dataset may be accessed from a medical imaging device according to an exemplary embodiment. The 3D dataset may include voxel data where each voxel is assigned a value corresponding to an intensity. At step 304, the processor 104 generates a volume-rendered image from the 3D dataset. According to an embodiment, the processor 104, may generate the volume-rendered image according to one of the techniques described with respect to FIG. 2. As part of the generation of the volume-rendered image during step 304, the processor 104 determines the shading for the volume-rendered image. As described hereinabove with respect to FIG. 2, the shading of the image may include calculating how light from a specific light direction would interact with the structure represented in the volume-rendered image. The algorithm controlling the shading may calculate how the light would reflect, refract, and diffuse based on the orientation of the surfaces represented in the volume-rendered image. The orientation of the light direction directly affects how the volume-rendered image is shaded. Shading of volume-rendered images is well-known by those skilled in the art and will therefore not be described in additional detail.

At step 306, the processor 104 displays the volume-rendered image generated during step 304 on the display device 108. The volume-rendered image 402 (shown in FIG. 4) is an example of a volume-rendered image that may be generated and displayed according to an embodiment. Hereinafter, the method 300 will be described according to an exemplary embodiment illustrated in FIG. 4. It should be appreciated by those skilled in the art that other embodiments may differ from the exemplary embodiment.

Referring to FIGS. 1, 3, and 4, at step 308, the processor 104 displays a model of a solid, such as the model of the solid 406. The model of the solid 406 may be a model of a sphere in accordance with the embodiment depicted in FIG. 4. According to other embodiments, the model of the solid may include a model of a different shape, such a model of an ellipsoid or other shapes with a generally convex outer surface. According to yet other embodiments, the model of the solid may include a model of any shape with a generally smooth outer surface. Next, at step 310, the processor 104 displays a light direction indicator, such as the light direction indicator 405. According to an embodiment, the light direction indicator 405 may include both a light source icon 408 and a highlight 411. The light source icon 408 indicates the light direction used to shade the volume-rendered image 402. According to an embodiment, the light source icon 408 may be a model of an arrow 413 with an arrow head 415. The light source icon 408 may include a representation of a polygonal model that is directional or shaped so that a user can clearly identify one end from an opposite end. This way, the directional model can be used to clearly indicate light direction used to shade a volume-rendered image. The highlight 411 includes a bright area on the model of the solid 406. The highlight 411 may show an area of increased reflectivity due to illumination of the model of the solid from the light direction. The highlight 411 may be included as part of the rendering of the model of the solid 406.

Optionally, the processor 104 (shown in FIG. 1) may generate and display a scale volume-rendered image such as the scale volume-rendered image 404. The scale volume-rendered image 404 is a smaller representation of the volume-rendered image 402. The scale volume-rendered image 404 is shown from the same perspective as the volume-rendered image 402. According to some embodiments, the scale volume-rendered image 404 may optionally be shaded in the same manner, according to the same relative light direction as the volume-rendered image 402. That is, the position of the light direction with respect to the volume-rendered image 402 is the same as the position of the light direction with respect to the scale volume-rendered image 404. According to the embodiment shown in FIG. 4, the light direction is coming from the upper left side as indicated by the light source icon 408. The light direction in FIG. 4 is also slightly from the front side. For the purpose of this disclosure, the terms "front side" and "back side" will be used to describe the orientation of light direction with respect to images. A view direction is the direction from which the user views the images. The view direction is typically normal to the display device in the direction from the user towards the display device. For purposes of this disclosure, the term "front side" is defined to include the surfaces within a model or a volume-rendering that would be visible from the view direction. Conversely, for purposes of this disclosure, the term "back side" is defined to include the surfaces within a model or a volume-rendering that would be visible from a direction 180 degrees from the view direction. Since the volume-rendered image 402, the scale volume-rendered image 404, the light source icon 408 and the model of the solid 406 may all be volume-rendered, the terms "front side" and "back side" may be applied to any of the aforementioned elements. Therefore the shading 410 is pronounced on the right and lower sides of the volume-rendered image 402. While not shown in the schematic representation of the screen shot 400, the shading of the volume-rendered image 402 may include more subtle effects as well, including areas of reflection. Additionally, the shading may include one or both of diffuse shading and specular shading based on the light direction.

The model of the solid 406 and the light source icon 408 may both be generated from a polygonal model according to an embodiment. Using a polygonal model to generate the light source icon 408, allows the processor 104 (shown in FIG. 1) to accurately portray the three-dimensionality of the light source icon 408 from a variety of different perspectives with respect to the model of the solid 406. Since, according to an embodiment, the light source icon 408 may be shown in a variety of different positions and orientations with respect to the scale volume-rendered image 404 and the model of the solid 406. According to an embodiment, the model of the solid 406 may be transparent or semi-transparent in order to allow the viewer to see the position of the light source icon 408 and/or the highlight 411 even when the light source icon 408 or the highlight 411 is on the backside of the model of the solid 406. The processor 104 (shown in FIG. 1) may apply some shading to the light source icon 408 in order to give the user a better sense of perspective regarding the orientation of the light source icon 408.

Next, at step 315, a user determines if it is desired to move the light direction indicator 405. If it is not desired to move the light direction indicator 405, then the method ends. However, if it is desired to move the light direction indicator 405, the method 300 advances to step 316. At step 316, a user may input a command through the user input 106 (shown in FIG. 1) in order to reposition the light direction indicator 405. The user may use the user input 106 to move the position of the light direction indicator 405. According to an exemplary embodiment, the user input 106 may include a trackball or mouse configured to function as a virtual trackball. For example, the movement of the mouse or trackball may be projected onto a virtual trackball, that controls the rotation of the light direction indicator 405. The translation movement from the user input 106 results in a rotation of the virtual trackball in the direction of the translation movement. For example, according to an embodiment represented in the screen shot 400, the light direction indicator 405 includes both the light source icon 408 and the highlight 411. The virtual trackball may control the position of the light source icon 408 and the highlight 411 with respect to the model of the solid 406. For example, both the light source icon 408 and the highlight 411 may be rotated about the model of the solid 406 in the rotational manner in real-time base on the rotation of the virtual trackball. According to another embodiment, the user input may include a trackball. The movements of the trackball may be directly mapped to the virtual trackball. That is, instead of simply controlling the translation of a pointer on the screen, the processor 104 (shown in FIG. 1) may move the light direction indicator 405 in a rotational manner about the model of the solid 406 that mirrors the user's movements with the trackball. It is very intuitive for a user to control the light direction in three dimensions using a trackball or a virtual trackball. According to either embodiment, the user may need to select a button or place a cursor, pointer or icon at a specific location, such as over the light navigator 409 (shown in FIG. 4) in order to initialize the functioning of the user input 106 as the virtual trackball. It should be appreciated, that the user input 106 may control the light direction in other ways according to other embodiments.

According to an embodiment, the processor 104 may shade the scale volume-rendered image 404 based on the same light direction that was used to shade the volume-rendered image 402 during step 304. For example, as described previously, the scale volume-rendered image 404 may be a smaller version of the volume-rendered image 402. This means that the scale volume-rendered image 404 shows the same structures in the same orientation as the volume-rendered image 402. Additionally, according to an embodiment, shading may be applied to the volume-rendered image 402 and the scale volume-rendered image 404 based on the same relative light direction. That is, the shading on the scale volume-rendered image 404 may be based on a light direction that is the same as the light direction used to generate the shading on the volume-rendered image 402. It should be appreciated by those skilled in the art that it may not be necessary to independently calculate the shading for the scale volume-rendered image 404. Instead, the processor 104 may use a smaller version of the volume-rendered image 402, including any shading, as the scale volume-rendered image 404. The result is that the shading may be the same in both the volume-rendered image 402 and the scale volume-rendered image 404. It should also be appreciated that since the scale volume-rendered image 404 is smaller than the volume-rendered image 402, it may be necessary for the scale volume-rendered image 404 to be lower in resolution than the volume-rendered image 402.

According to an embodiment, for the purposes of shading, the processor 104 may use the color, opacity, and location of each of the voxels as inputs in order to calculate how the light may reflect, refract, and diffuse on the various structures represented in the volume-rendered image in order to generate a more realistic volume-rendered image.

According to an embodiment, the model of the solid 406 may be at least semi-transparent. This means that the model of the solid 406 may be either complete transparent, in which case the model of the solid 406 would only be visible based on the way that it interacts with light from the light direction, or the model of the solid 406 may be partially opaque. For embodiments where the model of the solid 406 is semi-transparent (i.e. partially opaque) the model of the solid 406 may partially block the scale volume-rendered image 404. The highlight 411 may be generated by calculating how the model of the solid 406 would reflect and refract light originating from the light source icon 408 or the light direction according to an embodiment. It should be appreciated that while the highlight 411 is shown as a homogeneous area on FIG. 4, the area of reflection may decrease in intensity with radial distance away from the center of the arrowhead 415. For example, the area of reflection may smoothly decrease in intensity with radial distance away from the center of the arrow head 415. Other embodiments may not include the highlight 411 on the model of the solid 406.

Figure 5:
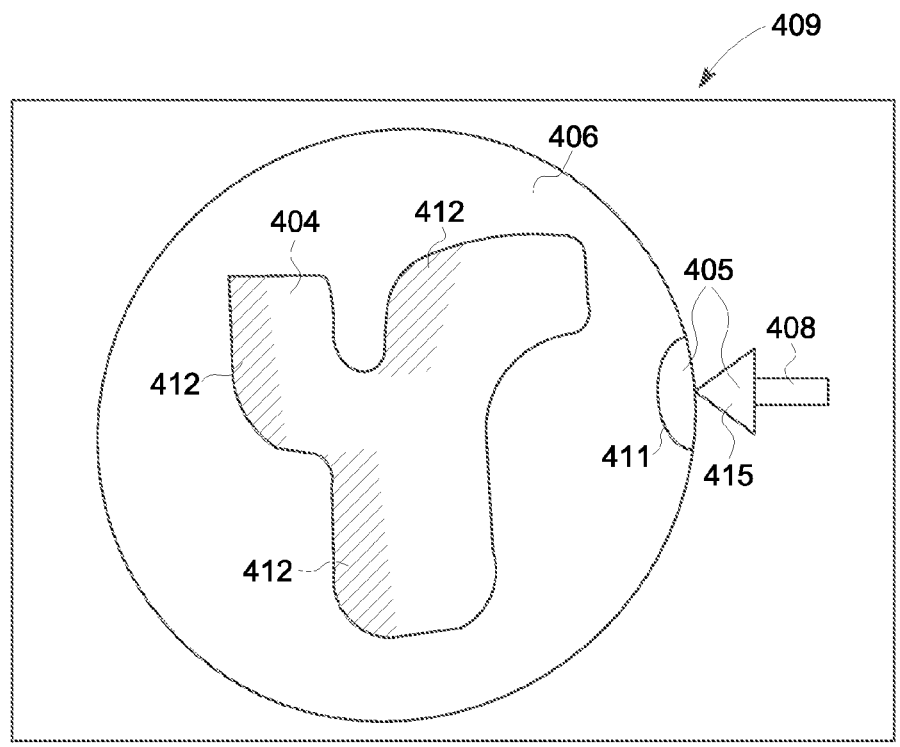
FIG. 5 is a schematic representation of a light navigator with a light source icon in a first position in accordance with an embodiment.
Figure 6:
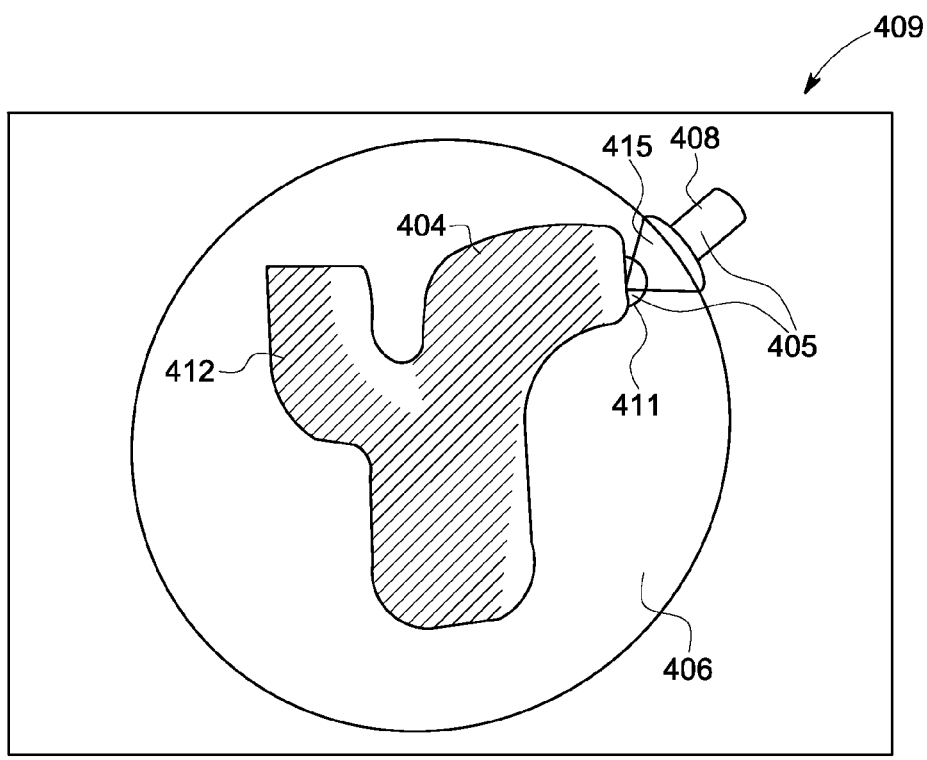
FIG. 6 is a schematic representation of a light navigator with a light source icon in a second position in accordance with an embodiment.
Figure 7:
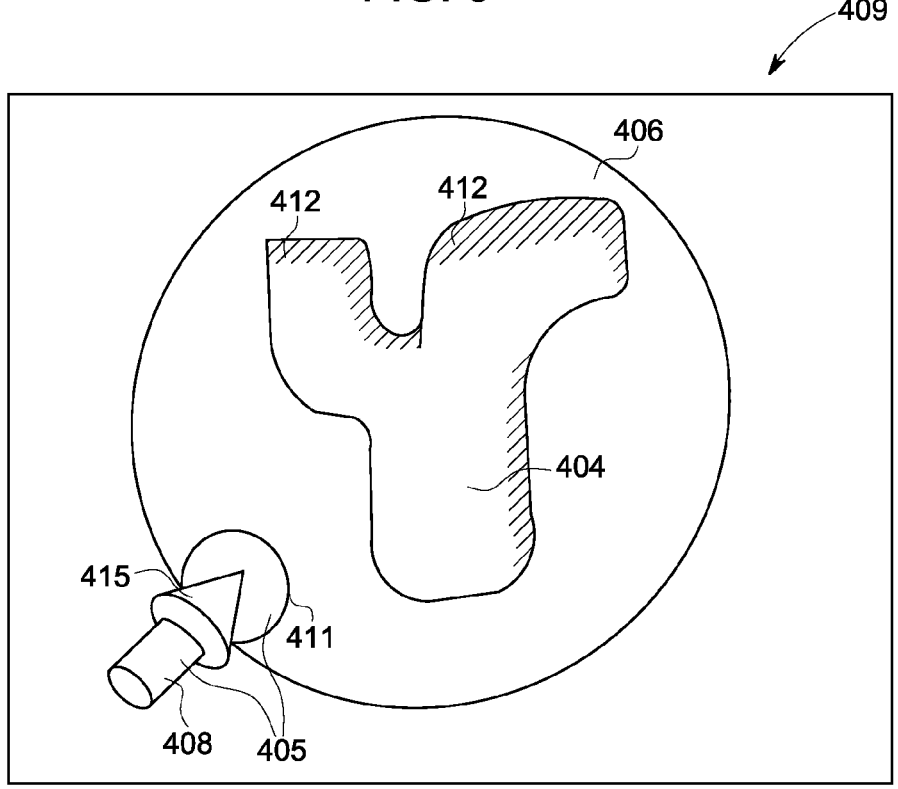
FIG. 7 is a schematic representation of a light navigator with a light source icon in a third position in accordance with an embodiment.

FIG. 5 is a schematic representation of the light navigator 409 with the light direction indicator 405 in a first position in accordance with an embodiment. FIG. 6 is a schematic representation of the light direction indicator 405 in a second position in accordance with an embodiment. FIG. 7 is a schematic representation of the light direction indicator 405 in a third position in accordance with an embodiment. Common reference numbers are used to identify identical components in the light navigator 409 shown in FIGS. 4, 5, 6, and 7.

Referring now to FIGS. 3, 4, 5, 6, and 7, as previously described, the user may move the light direction indicator 405 (shown in FIG. 4) from a first position to a second position at step 316. For example, the user may move the light direction indicator 405 from a first position, such as that shown in FIG. 4, to a second position, including any of the exemplary positions shown in FIGS. 5, 6, and 7. For example, a first exemplary position is shown in FIG. 5, a second exemplary position is shown in FIG. 6, and a third exemplary position is shown in FIG. 7.

Referring to FIG. 5, the light direction indicator 405 is positioned at the right side of the model of the solid 406. This corresponds to a situation where the light direction is originating from the right. The arrow head 415 is clearly pointing to the left. This corresponds to a situation where the shading of the volume-rendered image was done based on a light direction from the right. The scale volume-rendered image 404 includes shading 412 that is consistent with the light direction as indicated by the light source icon 408 and the highlight 411.

Referring to FIG. 6, the second exemplary position has the light source icon 408 positioned in the upper right, approximately in the 2 o'clock position. However, based on the geometry of the light source icon 408 and by noticing that the model of the solid 406 is in front of the light source icon 408, it is easy for a user to tell that the light source icon 408 is positioned slightly behind the model of the solid 406. In other words, the arrow head 415 is pointed slightly towards the view direction.

Referring to FIG. 7, in the third exemplary position, the light source icon 408 is in approximately the 7 o'clock position. However, the light source icon 408 is positioned in front of the model of the solid 406. This indicates that the light direction is from the front side of the model of the sphere. The arrow head 415 is pointing in towards the model of the sphere 406. The scale volume-rendered image 404 includes shading 412 that is consistent with the light direction as indicated by the light source icon 408.

According to an embodiment, the processor 104 (shown in FIG. 1) may control the order of rendering the light source icon 408, the model of the solid 406, and the scale volume-rendered image 404 in order to obtain the most realistic transparency values. For example, according to embodiments or configurations when the light source icon 408 indicates that light is coming from the front side, the processor 104 may perform the rendering by first rendering the backside of the model of the solid 406. Next, the processor 104, may render the scale volume-rendered image 404. Then, the processor 104, may render the front side of the model of the solid 406. And finally, the processor 104, may render the light direction icon 408.

In contrast, for embodiments or configurations when the light direction is from the backside, such as in FIG. 6, the rendering order would be the reverse. That is, first the light source icon 408 would be rendered, then the backside of the model of the solid 406, then the scale-volume-rendered image 404, and finally the front side of the model of the solid 406.

Referring to FIGS. 3 and 4, at step 318, the processor 104 (shown in FIG. 1) updates the shading of the volume-rendered image 402 based on the new, or second, light direction. According to an embodiment, the position of the light source icon 408 with respect to the scale volume-rendered image 404 is the same as the position of the new, or second, light direction with respect to the volume-rendered image 402. The processor 102 calculates the shading of the volume-rendered image 402 using the second light direction.

The processor 104 may then update the shading of the scale volume-rendered image 404 based on the second light direction. According to an embodiment, the processor 104 may calculate the shading based on the second light direction indicator 405 using the volume-rendered image 402 and apply the same shading to the scale volume-rendered image 404. Next, the processor 104 may update the shading of the model of the solid 406 based on the second light direction. By moving the light source icon 408 with respect to the scale volume-rendered image 404 and the model of the solid 406, the user is able to control the light direction used for shading the volume-rendered image 402. According to an embodiment, steps 316 and 318 may occur in real-time as the user is moving the light source icon 408. The result of this is that the shading on the volume-rendered image 402, the scale volume-rendered image 404, and the model of the solid 406 are all updated to reflect the real-time light direction as controlled by the position of the light source icon 408. This allows the user to quickly and easily see the effects of any changes in the light direction produced by movement of the light source icon 408. At 324, the user may optionally move the light source icon 408 again. If the user chooses to move the light source icon 408, then the method 300 returns to step 316, where steps 316, 318, 320, and 322 are repeated.

The combination of the scale volume-rendered image 404, the model of the solid 406, and the light source icon 408 allow the user to quickly and accurately comprehend the exact position of the light direction used to generate shading on the volume-rendered image 402. Since, according to an embodiment, both the scale volume-rendered image 404 and the model of the solid 406 are shaded based on the light direction, it is very intuitive for the user to understand the three-dimensional position of the light source icon 408. Additionally, the use of shading on the model of the solid 406 greatly aids a user in comprehending the relative positioning of the light source icon 408. For example, as the user move the light source icon 408, the shading on the model of the solid 406 may change in real-time corresponding to the changes in light direction. Shading applied to the model of the solid 406 will create areas of brightness and shadows in a manner that is very familiar to users. This will make it easier and faster for the user to accurately position the light source in order to obtain the desired shading on a volume-rendered image.

This written description uses examples to disclose the invention and to enable any person skilled in the art to practice the invention, including making and using any devices or system and performing any incorporated methods. The patentable scope of the invention is defined by the claims, and may include other examples that occur to those skilled in the art. For example, the light direction may represent the direction of a light beam used to shade the volume-rendered image. The light beam used to determine the shading of the volume-rendered image may be adjustable by a clinician in terms of width and/or degree of spread (e.g., varied from a collimated pencil beam to a diffuse pattern like a flood light or anywhere in between), color pallet (e.g., varied from "cooler" blue/green tints to "warmer" red/yellow tints or even natural skin tones) as well as intensity and/or penetration depth. These and other such examples are intended to be within the scope of the claims if they have structural elements that do not differ from the literal language of the claims, or if they include equivalent structural elements with insubstantial differences from the literal languages of the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A method of volume-rendering 3D medical imaging data comprising:
   generating a volume-rendered image from a 3D dataset acquired with a medical imaging device, wherein the volume-rendered image is shaded from a light direction;
   displaying the volume-rendered image;
   displaying a model of a solid at the same time as the volume-rendered image; and
   displaying a light direction indicator with respect to the model of the solid, wherein the position of the light direction indicator with respect to the model of the solid corresponds to the light direction used for shading the volume-rendered image.

2. The method of claim 1, wherein the model of the solid and the volume-rendered image are both displayed on the same display device and wherein displaying the model of the solid at the same time as the volume-rendered image includes displaying the model of the solid and the volume-rendered image at different positions on the same display device.

3. The method of claim 2, wherein the model of the solid is positioned at a bottom right-hand region of the display device.

4. The method of claim 1, wherein the model of the solid and the volume-rendered image are displayed on separate display devices.

5. The method of claim 1, wherein the light direction indicator comprises a light source icon and wherein the light source icon comprises a representation of a polygonal model.

6. The method of claim 1, wherein a combination of the model of the solid and the light direction indicator form a light navigator, the light navigator displayed separate from the volume-rendered image.

7. The method of claim 1, wherein the light direction indicator comprises a light source icon and wherein the light source icon comprises an arrow with an arrow head to indicate the light direction.

8. The method of claim 1, wherein the light direction indicator comprises a highlight on the model of the solid.

9. The method of the claim 1, wherein the light direction indicator comprises both a light source icon and a highlight on the model of the solid.

10. The method of claim 1, further comprising displaying a scale volume-rendered image within the model of the solid at the same time as the volume-rendered image, wherein the scale volume-rendered image comprises a smaller representation of the volume-rendered image.

11. The method of claim 1, wherein the model of the solid comprises a model of a sphere, wherein the light direction indicator comprises a light source icon comprising an arrow with an arrow head to indicate the light direction, and wherein the arrow head is adjacent to an outer surface of the model of the sphere.

12. The method of claim 1, wherein the model of the solid is a different shape than the volume-rendered image.

13. The method of claim 1, further comprising shading the volume-rendered image based on a second light direction in addition to the light direction and further comprising displaying a second light direction indicator at the same time as the light direction indicator, wherein the position of the second light direction indicator with respect to the model of the solid corresponds to the second light direction.

14. The method of claim 1, wherein the 3D dataset includes voxel data where each voxel of the voxel data is assigned a value corresponding to an intensity, where each voxel is a volume-element.

15. The method of claim 14, wherein generating the volume-rendered image includes shading the volume-rendered image based on the light direction and light interaction through the 3D dataset.

16. The method of claim 15, wherein shading the volume-rendered image further includes calculating how light from the light direction would reflect, refract, and diffuse through an object represented in the volume-rendered image based on a color, opacity, and location of each voxel in the 3D dataset.

17. The method of claim 14, wherein generating the volume-rendered image includes summing intensities of each voxel along a single ray cast from a single pixel in a view plane to the 3D dataset to assign a value to the single pixel, the view plane including a plurality of pixels forming the volume-rendered image.

18. The method of claim 14, wherein the volume-rendered image is formed by a plurality of pixels on a view plane, wherein each voxel is assigned an opacity, and wherein generating the volume-rendered image includes:

casting a plurality of parallel rays from the view plane to the 3D dataset, each ray corresponding to a single pixel of the plurality of pixels;

for each voxel, multiplying the assigned intensity by the assigned opacity to generate an opacity-weighted value; and accumulating the opacity-weighted values along each ray of the plurality of parallel rays to assign a value to each corresponding pixel.

19. The method of claim 1, wherein the model of the solid comprises a representation of a polygonal model and the volume-rendered image represents the 3D dataset, where the 3D dataset includes voxel data.

20. The method of claim 1, wherein the model of the solid is transparent or semi-transparent.

21. The method of claim 1, further comprising moving a position of the light direction indicator on the model of the solid to a new position based on user input received from a trackball, where rotational movement of the light direction indicator on the model of the solid mirrors rotational movement of the trackball.

22. The method of claim 21, further comprising updating the shading of the volume-rendered image based on the new position of the light direction indicator.

23. A method of volume-rendering 3D medical imaging data comprising:

displaying a volume-rendered image that is shaded from a first light direction, wherein the volume-rendered image is based on a 3D dataset acquired from a medical imaging device;

displaying a model of a solid at the same time as said displaying the volume-rendered image;

displaying a light source indicator at a first position with respect to the model of the solid, wherein the first position of the light source indicator corresponds to the first light direction used to shade the volume-rendered image;

moving with a user interface the light source indicator to a second position with respect to the model of the solid; and automatically updating the shading on the volume-rendered image to correspond with the second position of the light source indicator with respect to the model of the solid.

24. The method of claim 23, further comprising displaying a scale volume-rendered image within the model of the solid, wherein the scale volume-rendered image comprises a smaller representation of the volume-rendered image.

25. The method of claim 23, wherein the model of the solid comprises a model of a sphere, wherein the light source indicator comprises a light source icon comprising an arrow with an arrow head to indicate the first light direction, and wherein the arrow head is adjacent to an outer surface of the model of the sphere.

26. The method of 23, wherein the model of the solid comprises a representation of a polygonal model and is transparent or semi-transparent, wherein the model of the solid is a different shape than the volume-rendered image, and wherein displaying the model of the solid at the same time as displaying the volume-rendered image includes displaying the model of the solid at the same time as but separate from the volume-rendered image on a display device.

27. The method of claim 23, wherein the 3D dataset acquired from the medical imaging device comprises voxel data including a plurality of voxels, each voxel having an assigned intensity.

28. The method of claim 23, wherein moving with a user interface the light source indicator to a second position with respect to the model of the solid includes adjusting the light source indicator to the second position on an outer surface of the model of the solid based on direct input from the user interface, where the user interface includes a trackball where rotational movement of the trackball results in rotational movement of the light source indicator on the outer surface of the model of the solid.

29. A system for interacting with a 3D dataset comprising:
a display device;
a memory;
a user input; and
a processor communicatively connected to the display device, the memory and the user input, wherein the processor is configured to:
access a 3D dataset from the memory, where the 3D dataset was acquired with a medical imaging device;
generate a volume-rendered image from the 3D dataset that is shaded from a light direction;
display the volume-rendered image on the display device;
display a model of a solid at the same time as the volume-rendered image; and
display a light source indicator at a position with respect to the model of the solid to indicate the light direction used for shading the volume-rendered image.

30. The system of claim 29, wherein the user input comprises a trackball or a touch screen and the processor is configured to directly move the light source indicator using a virtual trackball, wherein when the user input is a trackball, movements of the trackball are directly mapped to the virtual trackball, and wherein the processor is further configured to display the model of the solid on the display device at the same time as the volume-rendered image but at a different position on the display device than the volume-rendered image.

31. The system of claim 29, wherein the 3D dataset includes voxel data where each volume-element of the voxel data is assigned an intensity value and wherein the volume-rendered image is generated by summing the intensity values of each voxel along a ray cast from a view plane containing a plurality of pixels to the 3D dataset for each pixel.

32. The method of claim 29, wherein the processor is further configured to display a scale volume-rendered image within the model of the solid and wherein the processor is further configured to shade both the scale volume-rendered image and the model of the solid based on the light direction.

33. The system of claim 29, wherein the model of the solid is generated from a polygonal model and is transparent or semi-transparent with a convex outer surface and wherein the processor is further configured to update the shading of the volume-rendered image to correspond with the position of the light source indicator with respect to the model of the solid as the light source indicator is moved.

* * * * *